INVENTORS
NOROL T. EVANS,
JOHN A. PROPSTER,
BARRY E. WILLIAMS,
BY J K Haskell
ATTORNEY.

| Detector | Detector Above RMS Noise | Detector Skim Level |
|---|---|---|
| D1 | 3 db | $V_1$ = SYSTEM SKIM LEVEL |
| D2 | 6 db | $V_1 + 3A$ |
| D3 | 9 db | $V_1 + 6A$ |
| D4 | 12 db | $V_1 + 9A$ |
| D5 | 18 db | $V_1 + 15A$ |
| D6 | 27 db | $V_1 + 24A$ |
| D7 | 39 db | $V_1 + 36A$ |
Fig. 3.
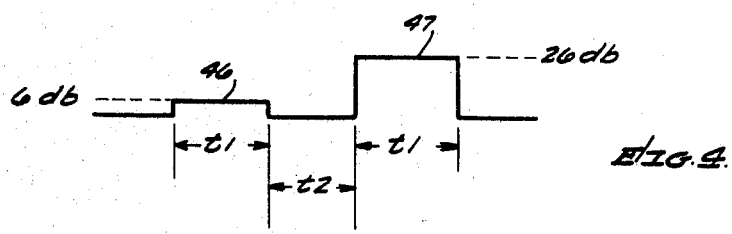
Fig. 4.
Fig. 5.
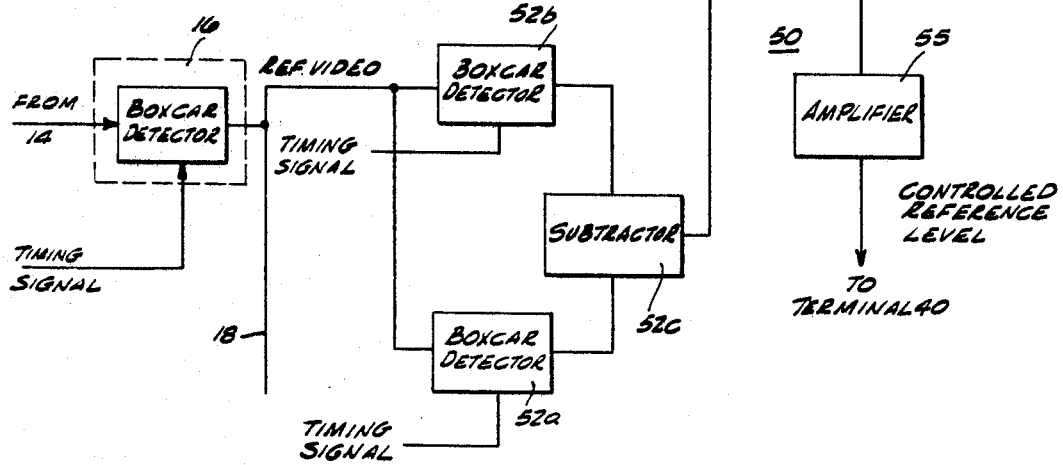

3,392,386
MULTILEVEL DIGITAL SKIMMER
Norol T. Evans, San Pedro, John A. Propster, La Mirada, and Barry E. Williams, Downey, Calif., assignors to Hughes Aircraft Company, Culver City, Calif., a corporation of Delaware
Filed Feb. 23, 1967, Ser. No. 619,124
9 Claims. (Cl. 343—5)

ABSTRACT OF THE DISCLOSURE

A coding circuit for converting video returns in a radar receiving system into a multilevel digital code. It includes a peak detector which converts the peak value of video returns in each system time period to a peak video signal. A plurality of detectors are employed to compare the peak video with a system skim level representing for example, a 3 db level above RMS noise. The detectors provide outputs which indicate the number of db's by which the peak video exceeds the skim level. A controllable reference level is supplied to the detectors to compensate for gain variations in the radar receiving system.

Background of the invention

*Field of the invention.*— This invention relates to coding circuitry and, more particularly, to a circuit, finding particular utility in a radar receiving system, for converting received video returns into a multilevel digital code.

A major problem in automatic detection, acquisition and digital track-while-scan radar systems is the automatic processing of all video returns from the surveillance radar. At present, nearly every radar system of any degree of complexity, employs a computer to process the video returns. These are generally quantized or digitized before being supplied to the computer for storage and processing.

Briefly, the video returns from each range interval, also known as a range bin, are digitized to represent a peak magnitude with respect to a selected threshold or skim level. It is the digitized video returns which are processed to detect and track meaningful radar targets. Since all data processing is performed on the digitized video returns, the accuracy of the radar system is greatly dependent on the accuracy and reliability with which the video returns are quantized or digitized.

Objects and summary of the invention

It is a primary object of the invention to provide an accurate digitizing circuit.

Another object of the invention is to provide a highly reliable and accurate circuit for digitizing or quantizing video returns into a plurality of digital codes.

A further object of the invention is to provide a digitizing circuit, adapted to accurately quantize video returns into a multilevel digitized code with respect to a selectively adjustable threshold or skim level.

Still another object is the provision of a relatively simple multilevel digital skimmer, finding particular utility in a radar receiving system for converting the peak video returns from each range bin into a code, representing the relative peak amplitude of the returns with respect to an adjustable skim level, the skimmer being accurately controllable so that it can be used in an automatic radar detection and acquisition system.

These and other objects of the invention are achieved by providing a digital circuit, including a peak detector and synchronizer. In one embodiment of the invention, assumed to be incorporated in a radar receiving system employing a logarithmic or log receiver, the amplified output of the log receiver is supplied to the peak detector and synchronizer, which determines the video peak value, occurring during each system time period, such as a range bin interval. This output of the synchronizer is supplied to a plurality of detectors, which provide true outputs when the video peak value exceeds a selected skim level by a pre-selected number of db's.

In one embodiment, 7 detectors are employed providing true outputs when the video peak value is 3 db, 6 db, 9 db, 12 db, 18 db, 27 db and 39 db above a selected level, such as RMS noise. To compensate for possible variation in the gain or volts per db of the log receiver, its associated amplifier and peak detector, a reference-level weighting circuitry is included, to control the detectors so that, irrespective of gain variations in the receiver and its associated circuitry, each detector provides an output only when the video peak value exceeds the selected skim level by the particular number of db's to the detector.

The novel features that are considered characteristic of this invention are set forth with particularity in the appended claims. The invention will best be understood from the following description when read in connection with the accompanying drawings.

Brief description of the drawings

FIGURE 3 is a chart relating the outputs of the various detectors with respect to the skim level;

FIGURE 4 is a waveform diagram of two reference signals used to generate an accurate reference level; and FIGURE 5 is a block diagram of additional circuitry incorporated in the system of the present invention.

Description of the preferred embodiments

Figure 1:
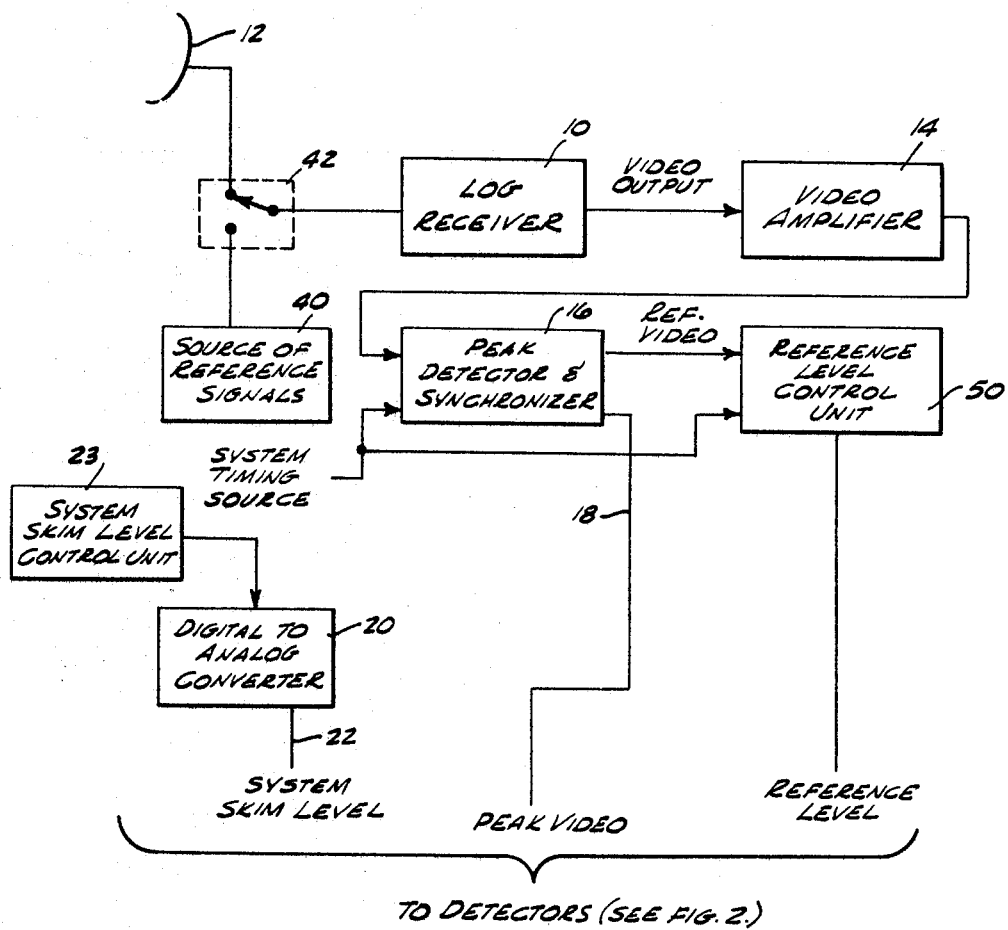
FIGURE 1 is a block diagram of radar input circuitry incorporated in the multilevel skimmer of the present invention.
Figure 2:
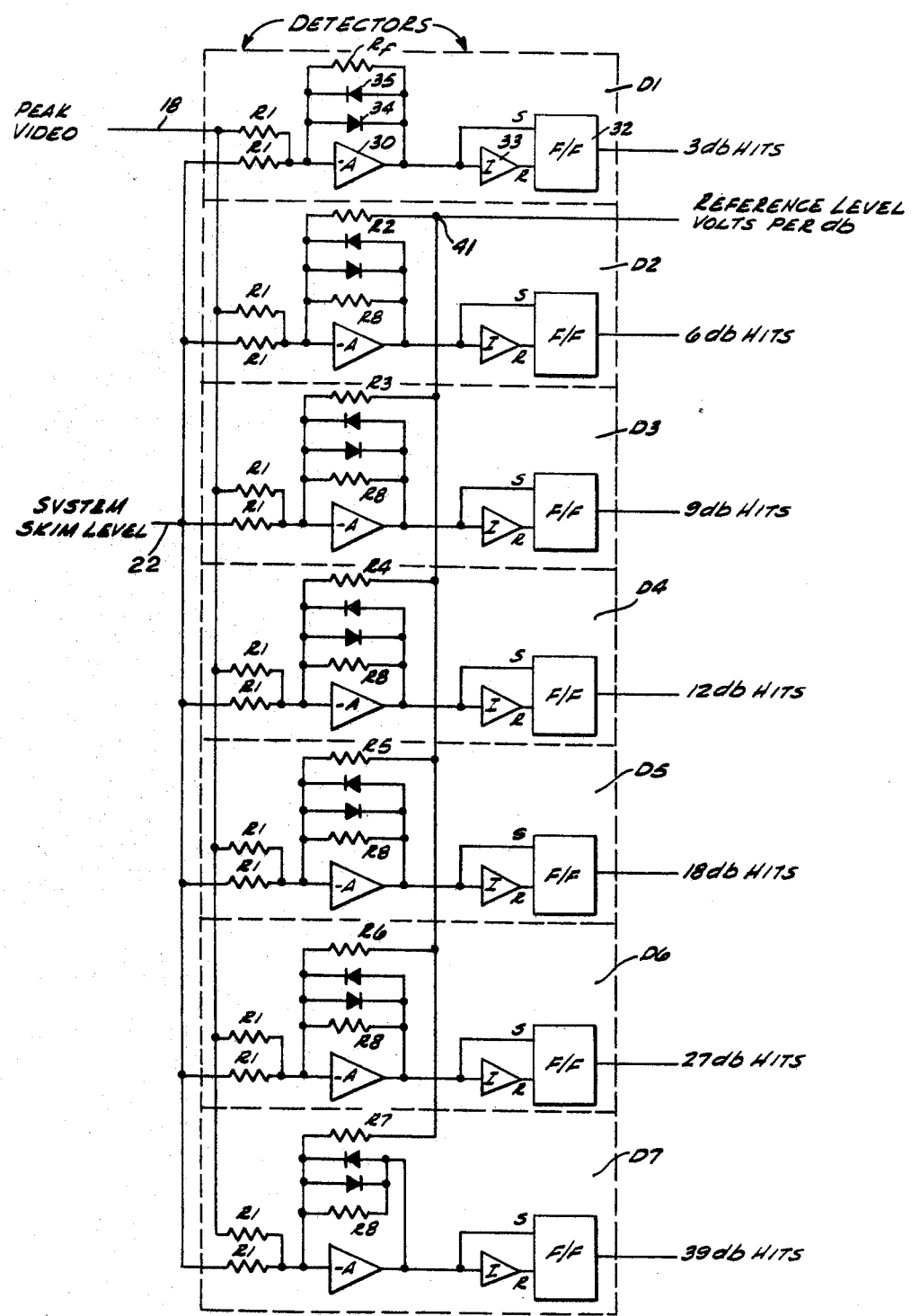
FIGURE 2 is a simple schematic diagram of the detectors of the invention.

Reference is now made to FIGURES 1 and 2. FIGURE 1 is a block diagram of the input circuitry for an array of detectors, schematically shown in FIGURE 2. As previously indicated, the invention will best be described for explanatory purposes in conjunction with a radar log receiver, though the invention may be employed with other types of radar receivers.

Briefly, the input of a log receiver 10 (FIGURE 1) is selectively switched to an antenna 12 to receive radio frequency signals therefrom. The receiver includes conventional radio frequency, mixing and detecting circuits for providing radar signals at video frequency as is well known in the art. Such signals may also be referred to as the receiver's video output signals. The video output of the log receiver 10 are amplified by a video amplifier 14, which is connected to a circuit 16, referred to as a peak detector and synchronizer. Circuit or peak detector 16 is also supplied with timing signals from a system timing source (not shown). Basically, the function of the detector 16 is to determine the peak value of the video returns occurring during each system time period or interval, such as one representing a range bin and supply it, by means of output line 18, to the detectors, shown in FIGURE 2. Such signals are referred to and designated PEAK VIDEO.

Peak detector 16 may comprise a boxcar detector which, in addition to the output video from amplifier 14, receives a timing signal during each system time period. As is appreciated by those familiar with the art of radar, such a detector is capable of providing an output representing the peak of the signals supplied to it during each time period. At the end of each time period the detector is reset to respond to the signals supplied during a subsequent time period. The output of peak detector 16, is also supplied to a reference level control unit 50 as reference video for purposes to be described hereafter in detail.

Hereafter for explanatory purposes, let it be assumed that under normal operating conditions, the video output signal of the amplifier 14 is proportional to the log of the input video signals from the antenna 12 by the relationship of 0.1 volts/db. Let it also be assumed that the gain of detector 16 is 1, under normal operating conditions. Consequently, an increase of 1 db in the signals received by log receiver 10 results in an increase of 0.1 volts in the output of detector 16. The RMS noise level is typically set at 1 volt. Hence, a signal 3 db above RMS noise would be 1.3 volts and a signal 6 db above the RMS noise level would be 1.6 volts.

As seen from FIGURE 1, the circuitry further includes a digital to analog (D/A) converter 20, the function of which is to supply, by means of an output line 22, an analog system threshold or skim level to the detectors as a function of digital signals received from a system skim level control unit 23. The function of the latter-mentioned unit is to maintain a constant predetermined false alarm rate for 3 db hits. That is, control the system's skim level, so that the rate at which video peak values of 3 db above the system's RMS noise received during a selected interval does not exceed a selected rate. Such control units or circuits, adjustable to perform such functions are well known by those familiar with the art of radar. One example of a control device used to control a threshold level as a function of target detection is shown and described in U.S. Patent No. 3,214,754 entitled, "Radar System With Automatic Threshold Control."

Reference is now made to FIGURE 2, wherein a plurality of detectors D1 through D7 are schematically diagrammed. For explanatory purposes only, the number of detectors has been limited to seven. Detector D1, is supplied with the PEAK VIDEO from the peak detector 16 (FIGURE 1) by means of line 18, and the system skim level through line 22. It compares the two levels and provides a true output whenever the PEAK VIDEO equals or exceeds the system's skim level.

Basically, the system skim level is controlled by the system skim level control unit 23 to be 3 db above the system's RMS noise level. Thus, the output of detector D1 is true only when the PEAK VIDEO is 3 db above the RMS noise of the radar system. Such a true output may be thought of as 3 db hit. In one arrangement, the true outputs of D1 are counted to determine the rate of 3 db hits. This in turn is used to adjust the system skim level so that a false alarm rate of 3 db hits does not exceed a desired value.

Similarly, detectors D2 through D7 are supplied with the PEAK VIDEO and the system skim level. They provide true outputs when the PEAK VIDEO is 6, 9, 12, 18, 27 and 39 db respectively, above the RMS noise. Each of the detectors D1 through D7 includes an operational amplifier 30, the input of which is connected to each of lines 18 and 22 through a separate resistor R1. The output of the amplifier is directly connected to the set (S) input of a flip-flop (FF) 32 and through an inverter 33, to the reset (R) input of the flip-flop. The true (T) output of the flip-flop comprises the output of the detector. A resistor $R_f$ and two diodes 34 and 35 form the feedback loop for the operational amplifier 30.

The flip-flops of the detectors are clocked, that is activated by clock or timing signals (not shown) to respond to the signals at their R and S inputs, so that all the detectors simultaneously supply outputs indicating the relative amplitude of the PEAK VIDEO with respect to RMS noise. It should be appreciated that once one of the detectors provides a true output all preceding detectors have true outputs. For example, when the PEAK VIDEO is at least 12 db's above RMS noise, but less than 18 db's, the output of D4 is true. Also, the outputs of D3 and D2 are also true since their outputs are true when the PEAK VIDEO exceeds RMS noise by at least 9 and 6 db's respectively.

The outputs of the detectors D2 through D7 may be supplied to a selection circuit (not shown), the function of which is to indicate the highest numbered detector having a true output, thereby indicating the range in db's of the PEAK VIDEO above RMS noise. This information may in turn be processed to determine the relationship of such PEAK VIDE to a radar target. The information may also be converted into a digital code for use in target processing. The present invention is directed to providing detector outputs which accurately indicate the number of db's of the PEAK VIDEO above RMS noise, rather than to the means for utilizing such outputs.

In addition, the inputs of amplifier 30 of detectors D2 through D7 are connected through resistors R2 through R7, respectively, to an input terminal 41, through which an accurately controlled reference level is supplied to these detectors. The values of R1 through R7 are chosen, so that the outputs of the detectors are true only when the PEAK VIDEO exceeds the system's skim level by a fixed number of db's. For example, in detector D2 the value of R2 is chosen with respect to R1 so that only when the PEAK VIDEO is 6 db's above the RMS noise, or 3 db's above the system skim level, is the output of D2 true. Similarly, in detector D3 the value of R3 is chosen so that only when the PEAK VIDEO is 9 db's above the RMS noise, that is, 6 db's above the skim level is the output of D3 true.

The operation of each detector (D2 through D7) may be expressed mathematically by the following equation:

$$I_{sum} = \frac{\text{PEAK VIDEO}}{R1} - \frac{\text{SYSTEM SKIM LEVEL}}{R1}$$
$$- \frac{\text{REFERENCE LEVEL}}{Rx} \geq 0 \quad (1)$$

where $x$ is 2, 3, etc., in detectors D2, D3, etc. The output of the detector is true when $I_{sum}$ is greater than zero (0). In the foregoing expression by multiplying each term by R1, one gets that, $$E_{sum} = R1 I_{sum} = \text{PEAK VIDEO}$$
$$- \text{SYSTEM SKIM LEVEL} - \frac{R1}{Rx}$$
$$\text{REFERENCE LEVEL} \geq 0 \quad (2)$$

By proper choice of the values of R2 through R7, with respect to R1 and the reference level, detectors D2 through D7 are controlled to provide true outputs only when the PEAK VIDEO is above the RMS noise level by a given number of db's.

For explanatory purposes, let the system skim level which is, as herebefore assumed 3 db's above the RMS noise be defined as $V_1$, and the output of the peak detector per db of video return as A. Then the output of D2 is true only when the PEAK VIDEO is $V_1 + 3A$, since D2 is designed to provide a true output when the PEAK VIDEO is 6 db above RMS noise, or 3 db above the system skim level.

The level $V_1 + 3A$ may be thought as defining the skim level of detector D2. The skim level for the other detectors are listed in the table, shown as FIGURE 3 to which reference is made herein.

From the foregoing, expression 2 may be rewritten for detector D2 as:

$$E_{sum} = V_1 + 3A - V_1 - \frac{R_1}{R_2} \text{ REFERENCE LEVEL}$$

$$= 3A - \frac{R_1}{R_2} \text{ REFERENCE LEVEL} \geq 0$$

It is thus seen that the accuracy of detector D2 to provide a true output when the PEAK VIDEO is 6 db above RMS noise or 3 db above the skim level depends on the accuracy of A or the volts per db through the log receiver 10, amplifier 14 and the peak detector 16 (FIGURE 1). If A were constant under all operating conditions, a fixed reference level could be supplied to the detectors at terminal 40. For example, if A were constant at 0.1 volts/db, a constant reference level $V_x$ could be provided and R2 in detector D2 chosen so that $$\frac{R_1}{R_2} V_x = 3(0.1) = 0.3 \text{ volts}$$

Similarly in detector D3, R3 could be chosen so that $$\frac{R_1}{R_3} V_x = 6(0.1) = 0.6 \text{ volts, etc.}$$

However, such is not the case in practice, since the overall gain or volts per db of the receiver 10, amplifier 14 and peak detector 16, i.e. A tends to vary. Consequently, the reference level cannot be a constant $V_x$ but rather, a controllable level.

Such control is accomplished by periodically monitoring the gain of volts per db through the receiver 10, amplifier 14 and peak detector 16 to determine changes therein from a gain A, assumed to represent a normal condition and adjust the reference level supplied to terminal 40 in accordance therewith.

For a better understanding of this aspect of the invention, reference is again made to FIGURE 1 and to FIGURE 4 which is a waveshape diagram of two reference signals. To monitor the gain A, between video returns at preselected instances, a source of reference signals 40 (FIGURE 1) is connected to the input of receiver 10 through a switch 42. Switch 42, which is of the type capable of switching radio frequency signals, connects the receiver 10 either to the antenna 12 or to source 40. When source 40 is connected it effectively replaces the antenna, to supply the receiver with signals of known amplitudes. Source 40 may also be coupled to the receiver 10 through a suitable directional coupler.

Irrespective of the type of connection between source 40 and receiver 10, when actuated, the source 40 sequentially supplies to the receiver 10, two pulses of equal durations and of known precise levels, such as 6 db and 26 db above a certain known level. In FIGURE 4, the two pulses are designated by numerals 46 and 47. Each is of an equal duration $t1$, separated by a time duration $t2$. The output of the peak detector 16 (FIGURE 1) in response to each of the reference pulses, designated in FIGURE 1, as REF. VIDEO is supplied to the reference level control unit 50, the output of which is connected to terminal 40 (FIGURE 2).

Briefly, unit 50 compares the outputs of detector 16 in response to each of the reference pulses 46 and 47 (FIGURE 4) by substracting the output in response to pulse 46 from the output in response to pulse 47. Unit 50 temporarily stores or holds the difference until a subsequent pair of pulses are passed to the receiver 10 from source 40.

Since the difference between pulses 46 and 47 is 20 db, the difference between the outputs of detector 16 should be 20 times the normal gain per db. For example, if as herebefore assumed, the gain per db is 0.1 volts, the difference should be 20 (0.1) = 2 volts. If the difference is 2 volts, the unit 50 supplies a normal reference level to the detectors. If, however, the difference is other than 2 volts, indicating that the gain per db through the receiver 10, amplifier 14 and detector 16 is other than normal, unit 50 adjusts the reference level accordingly.

Reference is now made to FIGURE 5 wherein one embodiment of unit 50 is shown in greater detail. In FIGURE 5, the peak detector 16 is shown comprising of a boxcar detector which receives the amplified video from amplifier 14. As previously stated, the boxcar detector is assumed to be gated or reset at the beginning of each system time period, such as a range bin, to provide the peak of the video received during such range bin. The boxcar detector of circuit 16 is similarly gated at the beginning of reference pulses 46 and 47, to provide REF. VIDEO to unit 50 in response to each reference pulse.

Unit 50 includes boxcar detectors 52a and 52b both receiving the REF. VIDEO. Detector 52a is assumed to be gated by a timing signal at the beginning of reference pulse 46, so that after pulse 46 is supplied, the REF. VIDEO related thereto is represented by the output of detector 52a, which is supplied to one input of a subtractor 52c. Similarly, at the beginning of reference pulse 47, detector 52b is gated by a timing signal to provide an output to a second input of subtractor 52c, representing the REF. VIDEO related to pulse 47. The outputs of detectors 52a and 52b continue to represent the REF. VIDEO in response to pulses 46 and 47 until at a subsequent time a second pair of pulses are supplied by source 40 to the receiver. All the timing signals for the boxcar detectors are supplied from a system timing source (not shown), in manners well known in the art.

In the meantime, subtractor 52c subtracts the output of detector 52a from the output of detector 52b. The subtractor's output which is supplied to one input of a difference amplifier 53, represents the difference between the peak outputs of detector 16 in response to pulses 46 and 47, which under normal conditions as herebefore assumed is 2 volts. Another input of amplifier 53 is connected to a terminal 54 which is in turn connected to a fixed potential, which in the present example is 2 volts. The output of difference amplifier 53 may in turn be amplified by an amplifier 55, whose output represents the controlled reference level supplied to the detectors D2 through D7 at terminal 40 (FIGURE 2).

When the gain per db in the receiver 10, amplifier 14 and detector 16 is as expected, the two inputs to the difference amplifier 53 are the same so that a normal reference level is supplied to the detectors. However, any variation in the gain per db from the normal results in a difference between the two inputs of amplifier 53 which in turn affects the output of amplifier 55 to adjust the reference level to compensate for the change in the gain per db. That is, in the foregoing relationship, such as in D2 in which $$3A - \frac{R1}{R2} \text{ REFERENCE LEVEL}$$

has to be equal to or greater than zero, any change in A is compensated for by a corresponding change in the reference level. Thus, the detectors of the present invention provide accurate indications of the peak of the video returns with respect to the system's RMS noise, despite changes in the gain per db of the input circuitry.

It should again be stressed that in the absence of the controlled reference signal, the detectors would provide correct indications of the number of db's by which the PEAK VIDEO exceeds RMS noise only if the gain per db of the receiver 10, amplifier 14 and detector 16 were constant. However, since this does not generally happen in a practical case, only by providing the controlled reference level, as herebefore described, are the detectors capable of providing an accurate indication.

There has accordingly been shown and described herein, a novel circuit which operates to digitally indicate in db's the relative amplitude of PEAK VIDEO received during a selected system time period with respect to RMS noise. The digital indication is in the form of true or false outputs of a plurality of detectors. Each detector provides a true output only when the PEAK VIDEO exceeds the RMS noise by a number of db's associated with the particular detector.

It is appreciated that those familiar with the art may make modifications and/or substitute equivalents in the arrangements as shown without departing from the true spirit of the invention. All such modifications and equivalents are deemed to fall within the scope of the invention as claimed in the appended claims.

We claim:

1. In a radar receiving system wherein video return signals are detected in radar receiving means including video amplifying means, a digitizing circuit for providing a plurality of output signals when the video return signals in said radar receiving means exceed an adjustable skim level by predetermined magnitudes, said digitizing circuit comprising:

peak detecting means for detecting the peak of the video return signals during each radar time period;

means for determining at selected instances the gain of signals by said radar receiving means, including said video amplifying means and said peak detecting means to provide a reference potential which is a function of said gain; and a plurality of detectors each responsive to said peak video return signals, said reference potential and said adjustable skim level, each detector providing an output signal of a first level when the peak video return signals are greater than said skim level by a preselected magnitude.

2. The circuit as recited in claim 1 wherein said digitizing circuit includes means to provide said adjustable skim level as a function of the root mean square (RMS) noise level of said radar receiving means, and each detector includes means to provide said output signal of said first level when the peak video return signals received thereby exceed said RMS noise level by a predetermined number of db's.

3. The circuit as recited in claim 2 wherein said means for determining include a source of first and second reference signals of predetermined amplitudes, means for sequentially supplying said first and second signals to said radar receiving means, means for sensing the output of said peak detecting means when said first and second signals are supplied to said radar receiving means and means for utilizing said sensed outputs of said peak detecting means to provide said reference potential as a function thereof.

4. The circuit as recited in claim 3 wherein said means for determining include a first detector for storing the peak video return signals in response to said first reference signal, a second detector for storing the peak video return signals in response to said second reference signal, subtracting means responsive to the return signals stored in said first and second detectors representing the response of said radar receiving means to a signal equal in magnitude to the difference between said first and second reference signals, and means for providing said reference potential as a function of the output of said subtracting means.

5. The circuit as recited in claim 4 wherein said first and second detectors are boxcar detectors and the difference between said first and second reference signals is an integer number of db's.

6. In a radar receiving system including a logarithmic receiver, means for detecting and amplifying video return signals to provide an output which is logarithmically related to said video return signals, a circuit for providing at least output signals which indicate the magnitude of said video return signals with respect to a selected threshold level, the circuit comprising:

a peak detector adapted to respond to system time-period-defining signals and the output of said log receiver for providing the peak of the video return signal during each system time period;

means adapted to receive a signal representative of a selected threshold level;

means for selectively supplying said log receiver with first and second reference signals of known levels;

means for sensing the outputs of said peak detector when said first and second reference signals are supplied to said log receiver to derive a reference level which is a function of the gain of said log receiver and said peak detector; and at least one detector responsive to said peak of the video return signals from said peak detector, said signal representative of a selected threshold level and said reference level to provide an output signal of a first level when the peak of said video return signals is not less than said threshold level by a preselected amplitude.

7. The circuit as recited in claim 6 wherein said first reference signal is above said second reference signal by a preselected number of db's and said means for sensing include means for subtracting the output of said peak detector when said second reference signal is supplied to said log receiver from the output of said peak detector when said first reference signal is supplied to said log receiver to produce a difference signal and means for controlling said reference level with said difference signal.

8. The circuit as recited in claim 7 wherein said means for sensing include first and second boxcar detectors for respectively storing the output of said peak detector when said first and second reference signals are supplied to said radar means, said means for subtracting providing an output representing the difference between the signals stored in said first and second boxcar detectors.

9. The circuit as recited in claim 7 wherein said circuit includes a plurality of detectors each providing an output level signal when the peak of said video return signals is not less than said threshold level by a number of db's associated with said detector.

References Cited

UNITED STATES PATENTS 3,341,816   9/1967   Davis et al. _____ 328—116 X

RODNEY D. BENNETT, *Primary Examiner.*

C. L. WHITHAM, *Assistant Examiner.*